Figure 1:
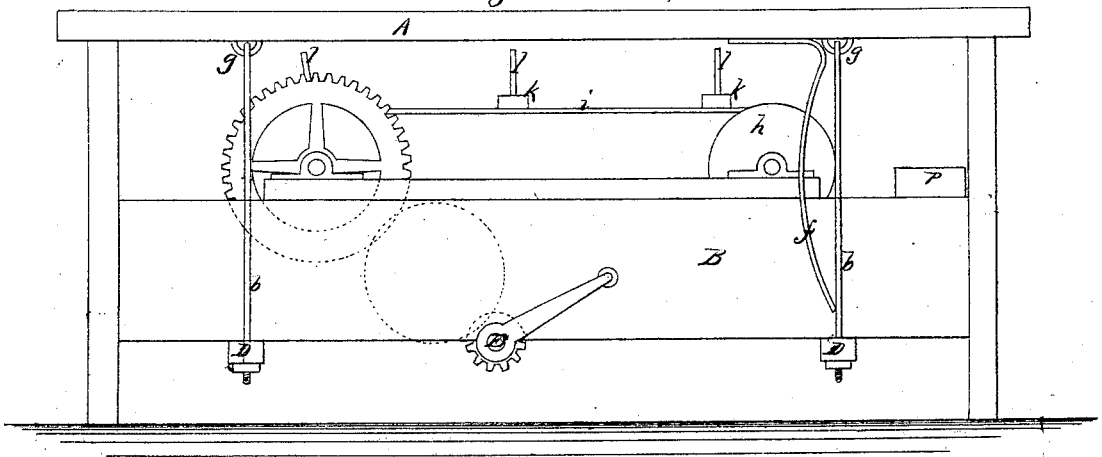
Figure 2:
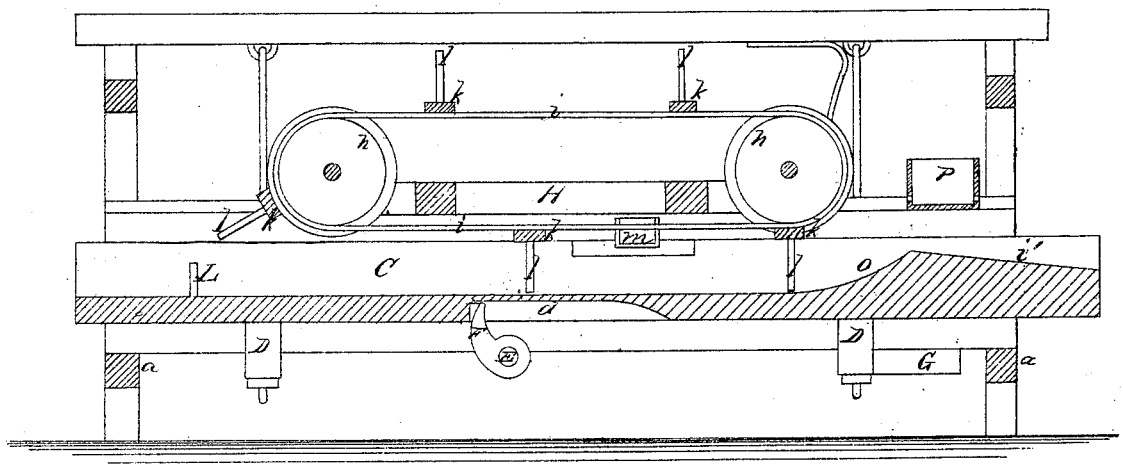

WILLIAM C. STILES.
Improvement in Ore-Concentrators.

No. 114,486.            Patented May 2, 1871.

Witnesses
Geo. H. Strong
H. Lattaff Borne

Inventor.
Wm. C. Stiles
By his Atty's
Dewey & Co.

United States Patent Office.

WILLIAM C. STILES, OF NEVADA CITY, CALIFORNIA.

Letters Patent No. 114,486, dated May 2, 1871; antedated April 22, 1871.

IMPROVEMENT IN ORE-CONCENTRATORS.

The Schedule referred to in these Letters Patent and making part of the same.

*To all whom it may concern:*

Be it known that I, WILLIAM C. STILES, of Nevada City, county of Nevada, State of California, have invented an Improved Concentrator; and I do hereby declare the following description and accompanying drawing are sufficient to enable any person skilled in the art or science to which it most nearly appertains to make and use my said invention or improvement without further invention or experiment.

My invention relates to an improved device for concentrating sulphurets and separating them from the sand in which they are contained; and It consists of a raking device which moves along the sluice in which the tailings are placed, and stirs up the sand so as to allow the sulphurets to settle to the bottom, while, by a peculiar jarring motion, they are caused to move to a certain position in the sluice, whence they are conveyed into any receptacle prepared to receive them.

In order to explain my invention so that others will be able to understand its construction and operation, reference is had to the accompanying drawing forming a part of this specification, in which—

A represents a frame, which is made somewhat wider than the sluice which passes through it, and is provided with the side boards B.

The sluice C is suspended at a slight incline inside the frame A in the following manner:

Secured to the bottom of the sluice, near each end of the frame, is a cross-piece, D, the extremities of which are reduced so that they shall extend to the outside of the frame, while the sluice will be held at a sufficient height above the end timbers *a a* of the frame to allow it to swing freely.

Swinging rods *b* are secured to the upper timbers at *g g* and their lower ends to the projecting ends of the cross-pieces D, thus suspending the sluice inside the frame.

A shaft, E, passes across the frame beneath the sluice and carries a cam, F.

The bottom of the sluice is provided with a wedge-shaped recess, *d*, into which the cam enters, when the shaft is revolved until it strikes the square side of the recess, when it carries the sluice forward a short distance.

As soon as the cam has passed the projection the sluice is retracted by springs *f*, which are secured to the upper timbers and bear against the swinging rods *b*.

These springs carry the sluice back until the block G, which is secured to the bottom of the sluice, strikes the lower timber A of the frame, thus giving it a slight and sudden jar at each vibration.

Secured upon the side boards B, above the sluice, is a three-frame, H.

This frame carries at each end two pulleys, *h*, upon the same shaft.

Endless belts *i* pass around the opposite pulleys upon each side, and are united at proper distances apart by cross-pieces *k*.

These cross-pieces are provided with long teeth *l*, which, as the belts are revolved, rake along the bottoms of the sluice and stir up the sand, as hereinafter described.

Figure 3:

The teeth *l* have their extreme ends bent somewhat in the form of the mold-board of a plow, as shown at Figure 3, so that, in passing up the sluice, the foot or lower portion of the mold-board will pass under the surface of the sand and lift it so as to allow the water to wash under and lift the sand, thus loosening it up in such a manner as to more thoroughly separate the light from the heavy portion.

The drum or pulleys *h*, which carry the endless belt, can be driven by means of gearing connected with the shaft E.

The tailings are fed into the sluice through the spout *m* in the side board B, underneath the endless belt, and immediately spread themselves over the bottom of the sluice, banking up against a riffle, L, which is placed across the sluice just beyond reach of the rakes or teeth *l*.

The rakes then stir up the mass and allow the sand to be carried off over the riffle by the water, while the peculiar sudden jar imparted to the sluice reacts upon the sulphurets or heavy particles which lie upon the bottom in such a manner as to cause them to travel or be drawn in the opposite direction until they arrive at the incline *o* in the bed of the sluice, up which they are also moved.

A drip-box, P, is placed across the sluice directly over the incline *o*, from holes in the sides of which clear water is constantly dripping. The drip from one side washes away any sand which may be carried along with the sulphurets as it ascends the steep ascent or the incline *o*, while the drip from the opposite side carries the sulphurets down the opposite gradual incline *i'* into any receptacle prepared to receive them.

Having thus described my invention,

What I claim, and desire to secure by Letters Patent, is—

1. The sluice C inside the frame A, suspended by means of the cross-pieces D and swinging rods *b*, substantially as and for the purpose above described.

2. The cam F, wedge-shaped recess *d*, springs *f*, and block G, operating as described, for communicating to the sluice a sudden jar or concussion, for the purpose above specified.

3. The endless belt or belts *i*, carrying teeth *l* either arranged upon cross-pieces *k* or otherwise, substantially as and for the purpose above described.

4. The teeth or stirrers $l$, with their stirring extremities formed similar to the mold-board of a plow, substantially as and for the purpose described.

5. A swinging sluice C, provided with the riffle L, steep incline $o$, and gradual incline $r$, substantially as and for the purpose above set forth.

6. The drip-box P pierced with holes upon its opposite sides, and arranged to feed water upon the two inclines $o$ and $r$, substantially as specified.

In witness that the above-described invention is claimed by me I have hereunto set my hand and seal.

WM. C. STILES. [L. S.]

Witnesses:
WM. L. TISDALE,
J. E. BROWN.